United States Patent [19]

Fluck

[11] 4,369,996
[45] Jan. 25, 1983

[54] SUN VISOR SYSTEM FOR TRUCKS

[75] Inventor: David W. Fluck, San Jose, Calif.

[73] Assignee: PACCAR Inc., Bellevue, Wash.

[21] Appl. No.: 322,890

[22] Filed: Nov. 19, 1981

Related U.S. Application Data

[63] Continuation-in-part of Ser. No. 241,658, Mar. 9, 1981, abandoned.

[51] Int. Cl.$^3$ .............................................. B60J 3/02
[52] U.S. Cl. ........................... 296/97 K; 160/DIG. 3; 248/289.1
[58] Field of Search ................ 296/97 K, 97 R, 97 C, 296/97 H; 160/DIG. 3, 221; 248/289 R, 215

[56] References Cited

U.S. PATENT DOCUMENTS

| | | | |
|---|---|---|---|
| 1,599,185 | 9/1926 | Phillips | 296/97 K |
| 2,485,440 | 10/1949 | Friedheim | 296/97 C |
| 2,965,416 | 12/1960 | Dryden | 296/97 R |
| 3,767,256 | 10/1973 | Sarkees | 296/97 K |

Primary Examiner—Robert R. Song

Attorney, Agent, or Firm—Owen, Wickersham & Erickson

[57] ABSTRACT

A multiple sun visor system for vehicles, particularly cab-over-engine trucks, includes a pair of side visors and a center visor which form a nearly continuous line of visors when in the normal forward position. The side visors swing along a vertical axis to the side windows, in the conventional manner, while the center visor is limited to pivoting fore and aft. Special mounting brackets for the center visor cooperate with the adjacent inner, free ends of the side visors to provide supports for those free ends when the side visors are stored in their normal forward positions. For this purpose, the bracket includes a special recessed portion for receiving and cradling a projection at the end of the adjacent side visor. When a side visor is in the forward stowed position, upwardly pivoted against the vehicle's ceiling, it will not be released from the special bracket without first being pivoted downwardly, so that unwanted movement of the side visor away from the forward position is prevented.

6 Claims, 4 Drawing Figures

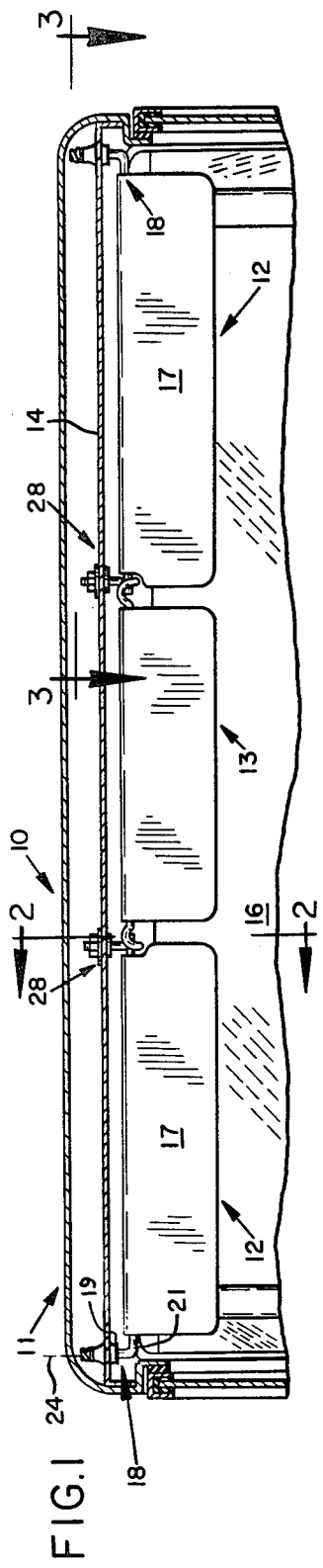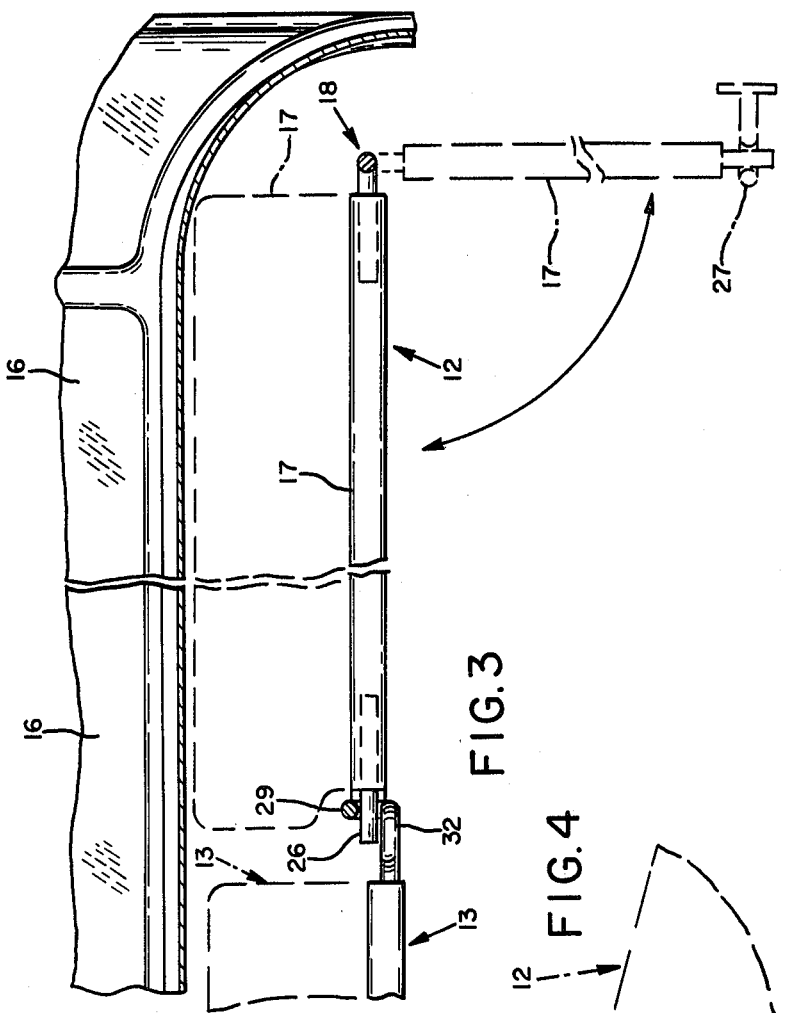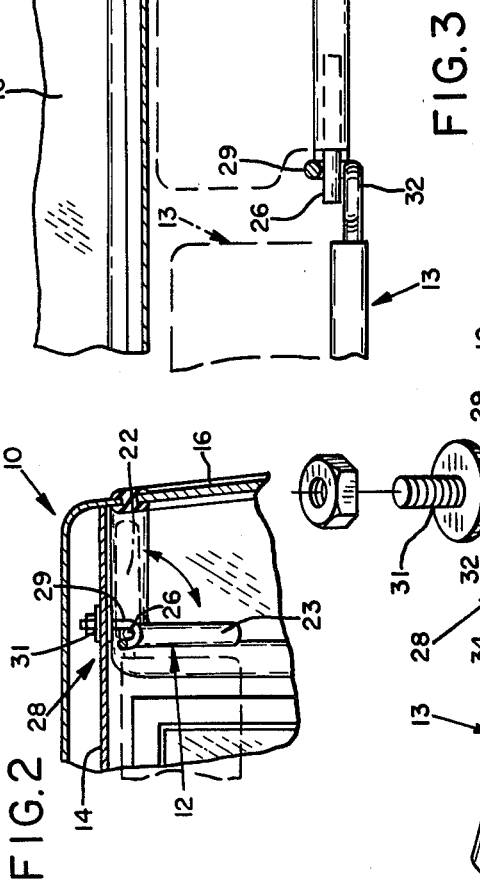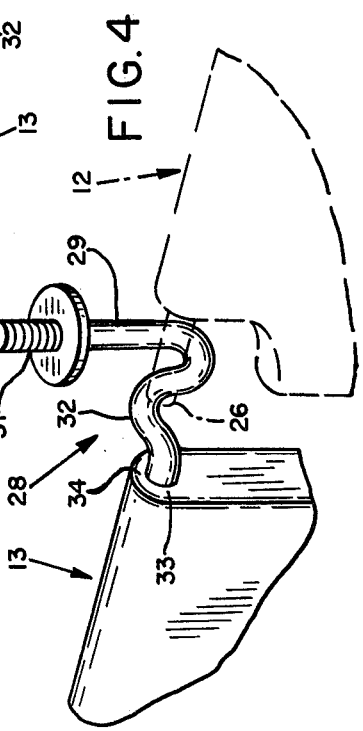

SUN VISOR SYSTEM FOR TRUCKS

REFERENCE TO RELATED APPLICATION

This application is a continuation-in-part of application Ser. No. 241,658, filed Mar. 9, 1981, now abandoned.

BACKGROUND OF THE INVENTION

The invention relates to sun visors for vehicles, and more particularly to a three-visor system covering the full width of a front windshield.

In most vehicles, particularly trucks, sun visor systems have traditionally consisted of two visors mainly shading the windshield areas in front of the driver and the passenger. Such typical systems lacked versatility in moving the visor to the proper position under various sun conditions. A few sun visor systems have employed a center visor. However, in such systems the side visors either were not provided with clips for holding their free ends in the normal position, or they have employed a separate clip for each side visor, not associated with the center visor hardware. For example, see U.S. Pat. Nos. 2,485,440 and 3,767,256, each showing systems with three or more sun visors.

In general, prior visor systems have not been as versatile in shading the sun nor as efficient in structure as the present invention described below.

SUMMARY OF THE INVENTION

The present invention is a sun visor system having three separate visor pieces, each shading a section of the windshield. In the normal position the three visors shade substantially the full width of the windshield. When not in use each visor may be independently folded forward, up and out of the way.

Additionally, each of the two side visors may be pivoted on swivel bases about generally vertical axes in order to shade the side windows. A clip preferably is provided for receiving the free end of each side visor at the end of this swivel motion, mounted to the top part of the door jam at the side. Also, a clip is provided for the free end of each side visor in the normal position, but these clips are integral with special center visor mounting brackets according to the invention.

A sun visor system according to the invention, for the windshield of a vehicle, includes left and right pivotal, swingable visor assemblies, each having an outer end, toward the side of the vehicle, with a swivel base secured to the vehicle body near the side of the windshield and providing swinging movement about a generally vertical axis, between a normal forward position and a side window position. Each swivel base supports a rod extending into the edge of a visor to permit pivotal movement of the visor on the rod. Each of the visor assemblies has a generally horizontal projection at its inner, free end. Between the left and right visor assemblies is a center visor assembly, comprising a forwardly and rearwardly pivotal visor and a pair of special mounting brackets, one at each end, secured to the vehicle body between the left and right visors. This arangement provides a generally continuous curtain of visors across the top of the windshield. Each special mounting bracket includes clip means for receiving and cradling the projection extending from the inner end of the adjacent side visor when that side visor is in a normal forward position.

It is among the objects of the invention to improve on prior vehicular visor assemblies through the use of three visors covering the entire width of the windshield, with separate operability of each, for versatility in use. Further, it is a specific object of the invention to provide efficient mounting structure of the visors through the use of a special swivel base or bracket at each side of the center visor which also acts as a clip for the free end of each adjacent side visor when in the normal forward position. These and other objects, advantages and features of the invention will be apparent from the following description of a preferred embodiment, considered along with the accompanying drawings.

DESCRIPTION OF THE DRAWINGS

FIG. 1 is a forward-looking elevation view showing the three-visor system of the invention positioned in the normal forward sun-shading position at the front windshield of a vehicle.

FIG. 2 is a sectional elevation view taken along the line 2—2 of FIG. 1, showing one of the side visors from its outer end, and indicating the pivoting of the visor between a sun-shielding position and a stowed position adjacent to the vehicle's ceiling.

FIG. 3 is a plan view showing one of the side visors and its range of pivoting motion along a generally vertical axis between the normal forward position and a side window position.

FIG. 4 is a perspective view showing a special mounting bracket, one of which is included at each side of the center visor of the visor system, the mounting bracket having a dual function of supporting one end of the center visor and also providing a clip for stowing the free end of the adjacent side visor when in its normal forward position.

DESCRIPTION OF A PREFERRED EMBODIMENT

In the drawings, FIG. 1 shows a vehicle 10 including a system of visors 11 according to the invention. The visor system 11 includes left and right side visor assemblies 12 and a center visor assembly 13, each of which is secured to the vehicle structure 14 above the windshield 16. The left and right side visor assemblies are structured and function generally in accordance with conventional side visors: they each include a visor or shade 17 and a mounting bracket 18 having a swivel base 19 of conventional configuration permitting swiveling of the visor about a generally vertical axis. As is conventional, a rod 21 extends from the bracket 18 generally horizontally into the top edge of the visor 17, permitting pivoting of the visor about the rod as indicated in FIG. 2 between a stowed position 22 (dashed lines) and a sun-shielding position 23. Each visor assembly may also include an adjustable device (not shown) for establishing the desired degree of frictional engagement between the rod and the top edge of the visor, in the typical manner.

Each side visor 17 is also pivotable about a generally vertical axis 24 (see FIG. 1), via the swivel base 19 of the bracket 18. Such swinging of the visor assembly 12 is demonstrated in the plan view of FIG. 3, where the right side visor 17 is shown in the normal forward position in solid lines and in a side window position in dashed lines.

Each side visor assembly 12 includes a projection 26 at its inner or free end, for holding the visor's free end in the normal position or in the side window position, as shown in FIG. 3. The projection 26 is also shown, in greater detail, in FIG. 4. The projection 26 may simply comprise the end of the rod or bar 21 (FIG. 1), which may be continuous through the visor 17, typical of conventional assemblies.

As indicated in FIGS. 1, 3 and 4, the projection 26 of each side visor assembly 12 can be positioned on a side clip 27 when in the side position, and on a special mounting bracket 28 of the center visor assembly 13 when in the normal forward position, for holding the visor in these respective positions. The special mounting bracket 28, one on each side of the center visor assembly 13, serves the dual function of supporting the center visor and serving as a clip for holding the free end of the adjacent side visor in the forward position. It is configured preferably as shown in FIG. 4, forming a U-shaped recess 29 adjacent to and contiguous with a base end 31 which may be threaded as indicated to provide a fastener for attachment to the overhead structure 14 at the ceiling of the cab (see FIG. 1). At the other end of the U-shaped recess preferably is a laterally curving portion 32, which provides a curved guide surface over which the projection of the adjacent side visor is slipped when placed in and removed from the normal forward position.

The special mounting brackets 28, at each side of the center visor assembly 13, result in efficiency of hardware in a three-visor system while also providing a simplicity and continuity of appearance in the visor system. Another feature of the system is that, when the side visors are in the upwardly and forwardly pivoted, stowed position 22 shown in dashed lines in FIG. 2, the free end of the side visor 17 cannot easily be raised upwardly to remove it from the U-shaped clip area 29 of the special mounting bracket 28 of the adjacent center visor assembly 13. This is because, as can be seen from FIGS. 2 and 4, the thickness of the visor at 33 is greater than at 34. The difference is sufficient to cause interference with lifting of the visor's free end when stowed, due to contact with the ceiling structure 14, but not when in the lowered, sun-shading position. Therefore, the side visors will not be inadvertently pivoted away from the normal forward position when stowed; instead, they must be first deliberately pivoted downwardly from the stowed position 22 to approximately the sun-shading position, before the free end can be lifted clear of the U-shaped recess 29.

The embodiment described above illustrates the principles of the invention, but is not intended to be limiting. Various other embodiments and alterations to this preferred embodiment will be apparent to those skilled in the art and may be made without departing from the spirit and scope of the invention as defined by the following claims.

I claim:

1. A sun visor system for the windshield of a vehicle, comprising:

left and right pivotal, swingable visor assemblies, each having an outer end with a swivel base secured to the vehicle body near the side of the windshield and providing swinging movement about a generally vertical axis, between a normal forward position and a side window position, each swivel base supporting a rod extending into the edge of a visor for permitting pivotal movement of the visor on the rod, and each of the visor assemblies having a generally horizontal projection at its inner, free end; and a center visor assembly having a forwardly and rearwardly pivotal visor and a pair of special mounting brackets, one at each end, secured to the vehicle body between the left and right visors so as to provide a generally continuous curtain of visors across the top of the windshield, each special mounting bracket including clip means for receiving and cradling the projection at the inner end of the adjacent side visor when that side visor is in a normal forward position.

2. The sun visor system of claim 1, wherein the special mounting bracket comprises a bent rod having a base end with means for attachment to the vehicle body and an opposite end extending into the center visor, with a generally U-shaped recess formed by the rod between the ends and oriented generally upright and generally in a vertical longitudinal plane, positioned to cradle the projection of the adjacent side visor when the side visor is swung to the forward position.

3. The sun visor system of claim 2, wherein the rearward end of the U-shaped recess curves laterally as it extends toward the center visor, providing a curved guide surface over which the projection of the adjacent side visor is slipped when placed in and removed from the normal forward position.

4. The sun visor system of claim 3, wherein the base end of the rod is a vertical extension of the forward leg of the U-shaped recess formed by the rod.

5. A special mounting bracket for use in a multiple visor system of a vehicle wherein a series of visors including side visors and a center visor are positionable across the front windshield in succession, said bracket comprising a relatively rigid body having at one end fastening means for securing the bracket to the vehicle and at the opposite end a rod extending into a center visor, the center visor being pivotable about the rod, and the body further including means forming a recess for receiving and cradling an end projection of an adjacent swingable side visor when the side visor is in its normal forward position.

6. The special mounting bracket of claim 5, said relatively rigid body comprising a bent rod continuous with the rod extending into the center visor, the recess forming means comprising a U-shaped portion of the rod defined between the fastening means and the center visor, said U-shaped portion lying generally in a vertical longitudinal plane, positioned to cradle the projection of the adjacent side visor in the normal forward position.

* * * * *